(12) United States Patent
Kim et al.

(10) Patent No.: US 12,160,187 B2
(45) Date of Patent: Dec. 3, 2024

(54) MXene COATED HYDROPHILIC FIBER MEMBRANE-BASED COMPLEX GENERATOR AND MANUFACTURING METHOD THEREOF

(71) Applicant: Korea Advanced Institute of Science and Technology, Daejeon (KR)

(72) Inventors: Il-Doo Kim, Daejeon (KR); Jaehyeong Bae, Daejeon (KR); Min Soo Kim, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 447 days.

(21) Appl. No.: 17/245,256

(22) Filed: Apr. 30, 2021

(65) Prior Publication Data

US 2021/0344287 A1    Nov. 4, 2021

(30) Foreign Application Priority Data

May 4, 2020  (KR) .................. 10-2020-0053219
Mar. 23, 2021 (KR) .................. 10-2021-0037405

(51) Int. Cl.
| | | |
|---|---|---|
| H02N 11/00 | (2006.01) | |
| C01B 32/90 | (2017.01) | |
| C25B 5/00 | (2006.01) | |
| H01G 11/58 | (2013.01) | |
| H02N 2/00 | (2006.01) | |

(52) U.S. Cl.
CPC .......... H02N 11/002 (2013.01); C01B 32/90 (2017.08); C25B 5/00 (2013.01); H02N 2/22 (2013.01); *H01G 11/58* (2013.01)

(58) Field of Classification Search
None
See application file for complete search history.

(56) References Cited

U.S. PATENT DOCUMENTS

2019/0148085 A1* 5/2019 Kim ............... H02N 11/002
                                                    361/502
2021/0344287 A1* 11/2021 Kim ............... C01B 32/90

FOREIGN PATENT DOCUMENTS

| EP | 3482819 A1 | | 5/2019 |
|---|---|---|---|
| KR | 20190054915 A | * | 5/2019 |
| KR | 10-2020-0021219 A | | 2/2020 |
| KR | 20200021219 A | * | 2/2020 |
| KR | 102139866 B1 | * | 8/2020 |

(Continued)

OTHER PUBLICATIONS

Extended European Search Report dated Oct. 4, 2021 for European Patent Application No. 21172050.3; applicant: Korea Advanced Institute of Science and Technology (8 pages).

(Continued)

*Primary Examiner* — Dion R. Ferguson
(74) *Attorney, Agent, or Firm* — Clark & Elbing LLP

(57) ABSTRACT

Embodiments of the disclosure relate to a novel concept complex generator enabling high-efficient power generation by applying a polar solution to a MXene layer-coated hydrophilic fiber membrane-based complex generator, and a manufacturing method thereof. Specifically, a MXene layer-coated hydrophilic fiber membrane-based electrical energy generation device uniformly applies MXene particles to fiber strand surfaces of hydrophilic fiber membranes through a dipping process to form a MXene layer.

16 Claims, 20 Drawing Sheets

(56) References Cited

FOREIGN PATENT DOCUMENTS

KR      102172609 B1  *  11/2020
WO   WO-2019093701 A1  *  5/2019  ......... B01D 67/0046

OTHER PUBLICATIONS

Gao et al., "MXene/Polymer Membranes: Synthesis, Properties, and Emerging Applications," Chem Mater. 32(5):1703-1747 (published online Feb. 10, 2020; published in issue Mar. 10, 2020).
Office Action dated Nov. 28, 2022, for Korean Patent Application No. 10-2021-0037405, Kim et al., "MXene Layer Coated Hydrophilic Fiber Membrane Based Electrokinetic Power Generator and Manufacturing Method Thereof," filed Mar. 23, 2021 (8 pages).
Xue et al., "Water-evaporation-induced electricity with nanostructured carbon materials," Nat Nanotechnol. 12(4):317-321 (2017) (6 pages).

* cited by examiner

FIG. 4
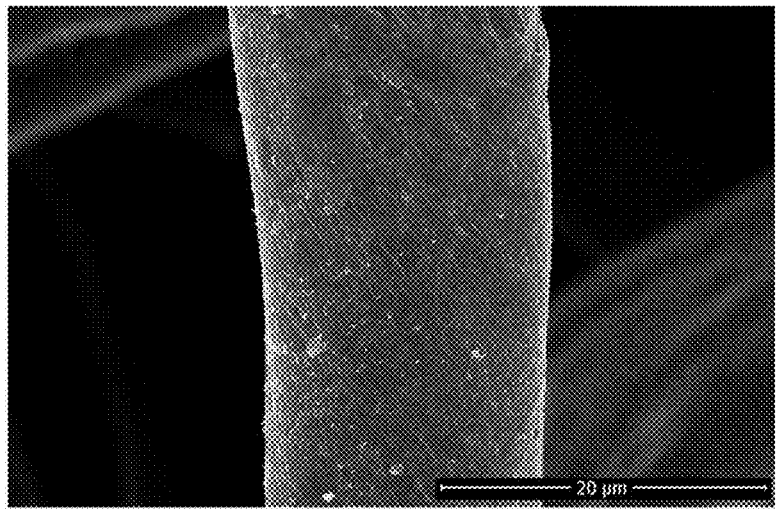
SCANNING ELECTRON MICROSCOPE IMAGE OF INDIVIDUAL
FIBERS ON MXENE-COATED COTTON FIBER MEMBRANE
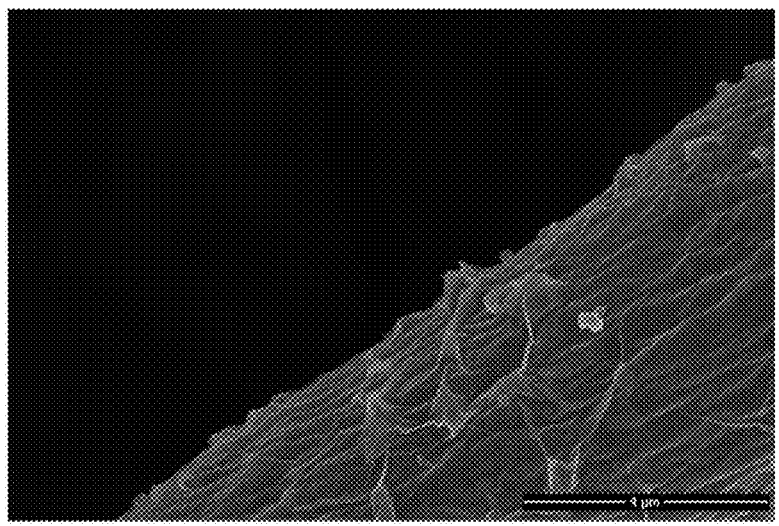
SCANNING ELECTRON MICROSCOPE IMAGE OF INDIVIDUAL
FIBERS ON MXENE-COATED COTTON FIBER MEMBRANE

CARBON-BASED COMPLEX GENERATOR

MXene COATED HYDROPHILIC FIBER MEMBRANE-BASED COMPLEX GENERATOR AND MANUFACTURING METHOD THEREOF

CROSS-REFERENCE TO RELATED APPLICATION(S)

This U.S. non-provisional application claims the benefit of priority under 35 U.S.C. § 119 to Korean Patent Application No. 10-2020-0053219, filed May 4, 2020, and Korean Patent Application No. 10-2021-0037405, filed Mar. 23, 2021, the entire contents of which are incorporated herein by reference in their entirety.

TECHNICAL FIELD

Embodiments of the disclosure relate to a high-efficient complex generator using a MXene layer-coated hydrophilic fiber membrane and a manufacturing method thereof. The complex generator forms a potential difference using an electrical double layer formed in a process in which a polar solution is adsorbed onto a surface of MXene, and uses the formed potential difference to generate electrical energy. Specifically, asymmetric wetting of a solvent formed by dropping a polar solution only onto an area where one of two electrodes connected to the MXene layer-coated hydrophilic fiber membrane is connected is used to form a potential difference between the two electrodes and generate an electric current through the diffusion of the solvent to a dry region of the membrane. The MXene layer-coated hydrophilic fiber membrane-based complex generator to which a polar solution is applied is manufactured through a dipping process, and MXene particles are uniformly applied to fiber strand surfaces of the hydrophilic fiber membrane to form a MXene layer. The hydrophilic fiber membrane having a large surface area and a high polar solution absorption capacity is a substrate which allows the MXene particles to be applied in as large an area as possible, and is able to absorb the polar solution well, and thus, well maintains an electrical double layer and a potential difference formed by the polar solution and the MXene particles. The complex generator manufactured using high conductive MXene reduces loss of resistance caused during energy generation, thereby enabling high-efficient power generation.

BACKGROUND ART

Energy generation devices provide electrical energy using environmentally friendly and abundant materials or energy, such as water, air, sun, etc., which are readily available in our surroundings. The energy obtained in this way is combined with sensor networks and wireless data transmission and reception technology-based electronic devices to improve the quality of life.

Typical examples of the energy generation devices include piezoelectric, in which a potential difference occurs due to structure deformation attributable to mechanical pressure, triboelectric, in which a potential difference occurs due to static electrification generated by mechanical friction, and thermoelectric, in which a potential difference occurs by heat flow. Each of the energy generation devices has an advantage of being able to generate a high voltage and a high power of several tens of µW to mW. In particular, piezoelectric and triboelectric energy generation devices are capable of converting the movement of a human body into electrical energy, and may thus be applied to wearable energy generation devices, thereby attracting much attention.

However, the developed energy generation devices have some clear disadvantages. First, electrical energy is generated in the form of a high frequency alternating current (AC) voltage and current according to respective energy generation principles. In the case of the piezoelectric or triboelectric energy generation devices in which electrical energy is generated via mechanical deformation and friction, a voltage difference is formed instantaneously only when mechanical deformation and friction are applied. When the applied mechanical action is removed, a voltage difference occurs again in an opposite direction, and for this reason, electrical energy has an AC form having a large number of vibrations. The high-frequency AC electrical energy is not applicable to driving electronic devices via direct connection. The piezoelectric and triboelectric energy generation devices therefore have a disadvantage in that energy generated in the energy generation devices is usable only when a separate rectifier circuit and energy storage devices are always involved.

Another problem is that repetitive mechanical deformation, friction, and heat flow damage or deform core components and materials of the energy generation devices, resulting in a sustained decrease in energy generation efficiency of the energy generation devices. In addition, materials used for the energy generation devices are based on materials having no electrical conductivity, and accordingly, most of the energy generation devices are equipped with current collectors (metal substrates) that provide electrical conductivity. The deformation of devices attributable to mechanical deformation, friction, and heat flow is a main cause of delamination of energy generation materials from the current collectors, which in addition results in poor energy generation efficiency and device reliability.

DISCLOSURE OF THE INVENTION

Technical Problem

In contrast, MXene layer-coated hydrophilic fiber membrane-based electrical energy generation devices are capable of generating electrical energy based on an electrical double layer principle simply by applying a small amount of a polar solution to the energy generation devices, and may thus continuously create a voltage difference without damaging the energy generation devices. In addition, since electrical energy to be generated is generated in the form of DC, it is possible to supply power directly to electronic devices without an additional rectifier circuit.

The disclosure provides a complex generator that generates electrical energy in the form of direct current (DC) by utilizing a voltage difference created in an electrical double layer formed when a polar solution is adsorbed on a surface of a MXene layer, and a manufacturing method thereof. The complex generator thus produced enables direct supply of high-efficient high power, and thus supplies power to electronic devices or stores energy generated in secondary batteries and super capacitors to increase utilization ranges thereof.

The disclosure also provides a method of manufacturing a MXene layer-coated hydrophilic fiber membrane-based complex generator which enables high-efficient power generation.

Technical Solution

According to one aspect of the disclosure, there is provided a MXene layer-coated hydrophilic fiber membrane-based complex generator and a manufacturing method thereof, wherein as one example of a MXene layer, a solution in which MXene particles are dispersed is prepared, a hydrophilic fiber membrane is cut to a certain size, the cut hydrophilic fiber membrane is dipped in the MXene coating solution in which the MXene particles are dispersed to evenly coat the hydrophilic fiber membrane with the MXene layer formed of the MXene particles, a complex generator (a MXene layer-coated hydrophilic fiber membrane-based complex generator) capable of generating DC electrical energy through a process of drying (e.g., drying at 80° C.) the MXene layer-coated hydrophilic fiber membrane in an oven is manufactured, and the MXene layer having an asymmetric wetting structure using a polar solution capable of amplifying voltage and current by stacking individual complex generators or connecting those individual complex generators in series or parallel is bonded to surfaces of individual fibers.

A method of manufacturing an electrical energy generation device based on an electrical double layer formed by a MXene layer coated on a hydrophilic fiber membrane and a polar solution includes the steps of (a) preparing a MXene coating solution forming a MXene layer, (b) cutting a hydrophilic membrane to a designed size, (c) dipping the hydrophilic fiber membrane into the MXene coating solution to coat surfaces of individual fibers constituting the hydrophilic fiber membrane with the MXene layer, (d) drying the MXene layer-coated hydrophilic membrane in an oven, (e) stacking two or more MXene layer-coated hydrophilic fiber membrane generators to manufacture a stack generator, and (f) connecting the stacked membrane generators in series and parallel and asymmetrically dropping a polar solution around only one electrode connected to the generators to form DC voltage and current.

The step (a) is a process of dispersing MXene particles in a polar solvent to prepare a MXene coating solution to be used in a dipping process, wherein specifically, the MXene particles may contain one or a mixture of two or more selected from $Ti_2C$, $(Ti_{0.5}, Nb_{0.5})_2C$, $V_2C$, $Nb_2C$, $Mo_2C$, $Mo_2N$, $(Ti_{0.5}, Nb_{0.5})_2C$, $Ti_3C_2$, $Ti_3CN$, $Zr_3C_2$, $Hf_3C_2$, $Ti_4N_3$, $Nb_4C_3$, $Ta_4C_3$, $Mo_2TiC_2$, $Cr_2TiC_2$, and $Mo_2Ti_2C_3$. MXene materials constituting the MXene layer may be mixed with conductive polymers to be used, and the conductive polymers to be used may include at least one conductive polymer material selected from poly(3,4-ethylenedioxythiophene) (PEDOT:PSS), polyaniline (PANI), polypyrrole (PPy), poly (p-phenylene vinylene) (PPV), poly(acetylene)s (PAC), and poly(p-phenylene sulfide) (PPS). The MXene materials are not limited to specific materials as long as the MXene materials have excellent electrical conductivity and are well bonded to a hydrophilic fiber membrane. A solvent used in the process of dispersing the MXene particles may be one or a mixed solvent of two or more selected from deionized water, isopropanol, acetonitrile, methanol, ethanol, ethylene glycol (EG), dimethylformamide (DMF), acetone, and dimethyl sulfoxide (DMSO). As the polar solution, a solution in which one or two or more electrolytes among various ions such as NaCl, KCl, NaBr, KBr and $CaCl_2$ are dissolved may be used. As the solvent used for the coating solution, it is preferable to use water which has a high polarity, a high dielectric constant and an easy access. As for concentration conditions of the solution used in the dipping process, a solution having a concentration range of 0.01 to 50 wt % for uniform application is used.

In the step (b), the hydrophilic fiber membrane is cut to a certain size to control the size of an electricity generation device. As a material of the hydrophilic fiber membrane, cotton, paper, thread, or the like having a high absorption force for a polar solvent may be used, and a porous membrane made of fiber strands having a diameter in the range of several tens nm to several hundreds μm (e.g., 50 nm to 500 μm) is used. The hydrophilic fiber membrane to be applied to the energy generation device is used by being cut into a size having an aspect ratio range of 1 to 100 so as to effectively absorb water and maintain asymmetric wetting, wherein the used hydrophilic fiber membrane has a thickness of 10 μm to 1 mm.

The step (c) is a process of dipping the hydrophilic fiber membrane into a solution in which the MXene particles are dispersed, and the cycle of dipping may be controlled to evenly apply the MXene particles to a surface of the hydrophilic fiber membrane. The hydrophilic fiber membrane cut to a certain size is dipped into the MXene coating solution prepared in the step (a) to prepare a MXene layer-coated hydrophilic fiber membrane. In this case, during the dipping process, the cycle of dipping may be controlled to easily adjust a loading amount of the MXene particles applied to the hydrophilic fiber membrane, thereby controlling the resistance of the MXene layer constituting an energy generation device. The resistance of the MXene layer greatly affects the flow of the generated voltage and current, and thus is preferably selected in a range of 100 W to 100 MW.

In the drying process of step (d), the hydrophilic fiber membrane dipped into the coating solution is placed flat on a tray and then subjected to drying in an oven (e.g., drying at 80° C.) to manufacture a MXene layer-coated hydrophilic fiber membrane-based complex generator.

The step (e) is a process of stacking two or more of the MXene layer-coated hydrophilic fiber membrane generators to manufacture a MXene layer-coated hydrophilic fiber membrane-based complex generator that increases an electrical double layer area between the polar solution and the MXene particles in the stacked membranes and maintains wetting for a long period of time by efficiently preventing evaporation of a polar solvent (typically, water).

In the step (f), the stacked MXene layer-coated hydrophilic fiber membrane-based complex generators are connected in series and parallel, and the polar solution is partially dropped onto only one of two electrodes connected to the MXene layer-coated hydrophilic fiber membrane-based complex generators, and the electrodes are connected such that a wetted region and a dry region are separated to form a circuit. On a surface of the MXene particles in the wetted region by the polar solution, by the formation of an electrical double layer, the surface of the MXene layer takes on a negative charge and forms a negative potential. Accordingly, a clear potential difference is created between the electrode wetted with water and the electrode connected to the dry region. In this case, when the two electrodes are connected through the circuit, DC voltage, DC current, and power are generated. However, when a too large amount of the polar solution is dropped and thus the polar solution comes into contact with both electrodes of the MXene layer-coated hydrophilic fiber membrane-based complex generators, the potential difference may be lost. Therefore, a proper amount of a polar solvent needs to be applied to a certain size of the MXene layer-coated hydrophilic fiber membrane. For example, in a case of a MXene layer-coated hydrophilic fiber membrane having a size of 0.5 cm (height)×7 cm (width) with an aspect ratio of 14, DC power may be generated when 30 μl of polar solution is dropped onto the left or right end of the MXene layer-coated hydrophilic fiber membrane-based complex generator.

Advantageous Effects

According to the disclosure, a MXene layer-coated hydrophilic fiber membrane-based complex generator may enable high-efficient power generation simply by adding water.

A MXene layer-coated hydrophilic fiber membrane-based complex generator manufactured using a dipping process is an environmentally friendly energy generation device that generates high-efficient DC power based on a large surface area and strong water adsorption performance of a MXene layer and excellent wetting and porosity of a hydrophilic fiber membrane. Due to the high conductivity of MXene, high-efficient power generation is allowed. In particular, in a case of a MXene layer-coated hydrophilic fiber membrane-based complex generator having a size of 0.5 cm (height)×7 cm (width), DC power may be generated with a small amount of 30 μl of polar solution, and mass production is easy, so that it is highly likely to be utilized as an auxiliary power supply device for home energy auxiliary devices, portable power supply auxiliary devices, and wearable electronic devices.

BRIEF DESCRIPTION OF THE DRAWINGS

The accompanying drawings, which are incorporated in and constitute a part of the detailed description for the purpose of understanding the disclosure, provide embodiments for the disclosure and, together with the description, explain the technical idea of the disclosure.

FIG. 4 is a scanning electron microscope image of a $Ti_3C_2$-coated cotton fiber membrane-based complex generator manufactured according to Example 1 of the disclosure;

MODE FOR CARRYING OUT THE INVENTION

Figure 1:
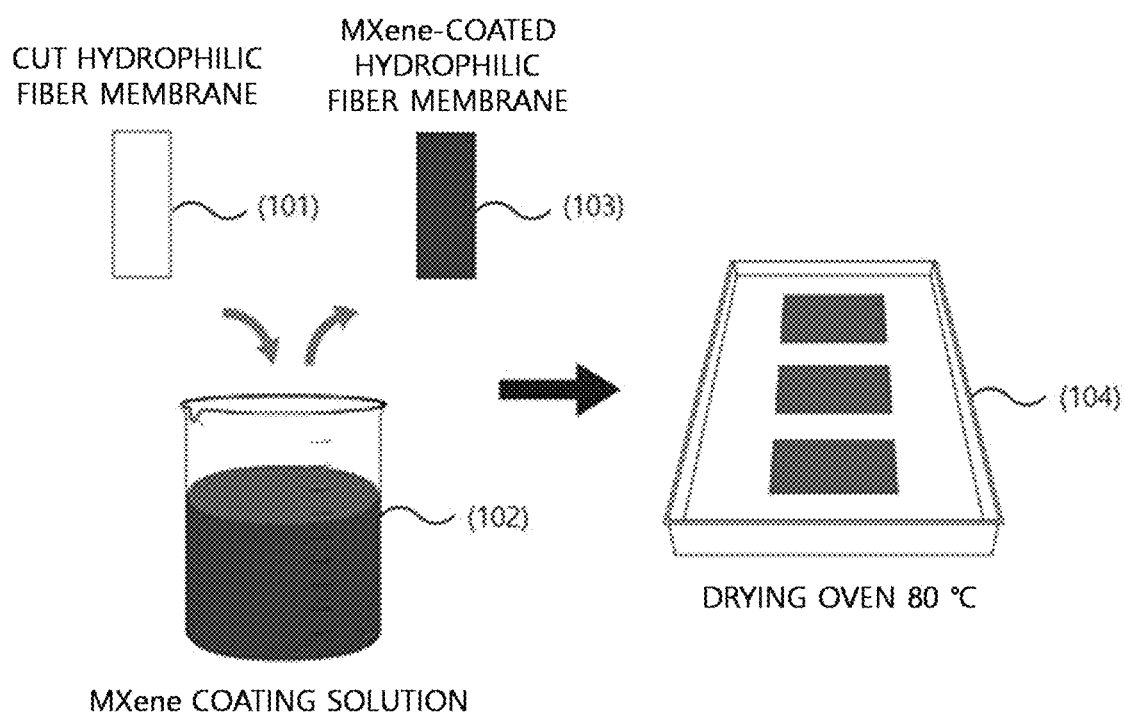
FIG. 1 is a schematic view of manufacturing a MXene layer-coated hydrophilic fiber membrane-based complex generator, which is a manufacturing process of the disclosure.

The disclosure may be variously modified and may have various embodiments, and specific embodiments will now be described in detail based on the accompanying drawings.

In describing the disclosure, when it is determined that a detailed description of the related art may obscure the gist of the disclosure, the detailed description thereof will be omitted.

Hereinafter, a MXene (hereinafter 'MXene') layer-coated hydrophilic fiber membrane-based complex generator and a manufacturing method thereof will be described in detail with reference to the accompanying drawings.

An embodiment of the disclosure provides a complex generator including a MXene layer-coated hydrophilic fiber membrane, wherein electrical energy is generated by an asymmetric wetting structure of a polar solution for the hydrophilic fiber membrane.

According to one aspect, in the MXene layer-coated hydrophilic fiber membrane, a wetted region and a dry region separated by the polar solution may form opposite poles to generate electrical energy.

According to another aspect, in the MXene layer-coated hydrophilic fiber membrane, electrical energy may be generated by using a voltage difference due to the presence or absence of an electrical double layer between a MXene layer in a region wetted by the polar solution and a MXene layer in a region non-wetted by the polar solution.

According to yet another aspect, electrical energy may be generated using current generated during diffusion of the polar solution from the wetted side to the dry side in the asymmetric wetting structure.

According to another aspect, the asymmetric wetting structure may include a structure which wets an area covering a range of 0.1% to 99% with respect to a total volume of the MXene layer-coated hydrophilic fiber membrane.

According to another aspect, the polar solution may contain one or a mixture of two or more among acetone, acetic acid, water, ethanol, acetonitrile, ammonia, methanol, isopropanol, and pyridine.

According to another aspect, the polar solution may include a solution in which one or more electrolytes among NaCl, KCl, NaBr, KBr, and $CaCl_2$ are dissolved.

According to still another aspect, MXene materials constituting the MXene layer may include at least one among $Ti_2C$, $(Ti_{0.5}, Nb_{0.5})_2C$, $V_2C$, $Nb_2C$, $Mo_2C$, $Mo_2N$, $(Ti_{0.5}, Nb_{0.5})_2C$, $Ti_3C_2$, $Ti_3CN$, $Zr_3C_2$, $Hf_3C_2$, $Ti_4N_3$, $Nb_4C_3$, $Ta_4C_3$, $Mo_2TiC_2$, $Cr_2TiC_2$, and $Mo_2Ti_2C_3$.

According to still another aspect, the MXene layer may be formed by mixing a MXene material and a conductive polymer, and the conductive polymer may include at least one conductive polymer material selected from poly(3,4-ethylenedioxythiophene) (PEDOT:PSS), polyaniline (PANI), polypyrrole (PPy), poly(p-phenylene vinylene) (PPV), Poly(acetylene)s (PAC), and poly(p-phenylene sulfide) (PPS).

According to yet another aspect, the MXene layer may be coated on the hydrophilic fiber membrane by loading the hydrophilic fiber membrane with a MXene material in a range of 0.9 mg/cm³ to 0.007 mg/cm³ per unit volume, and the amount of the loaded MXene material may be adjusted to change the resistance of the MXene layer-coated hydrophilic fiber membrane to control generated voltage and current.

According to another aspect, the hydrophilic fiber membrane may have the ability to absorb and contain water, and include at least one among cotton fabric, mulberry paper, polypropylene membrane, oxygen plasma treated nonwoven fabric, hydrophilic surface treated fabric, and nanofiber.

According to another aspect, the hydrophilic fiber membrane may be made of fiber strands for increasing a specific surface area, and may be coated with a MXene layer bonded to surfaces of the individual fibers.

According to another aspect, the fiber strands constituting the hydrophilic fiber membrane may have a diameter of 50 nm to 500 μm.

According to another aspect, the hydrophilic fiber membrane may have a thickness of 10 μm to 1 mm.

According to another aspect, the hydrophilic fiber membrane may have a width to height aspect ratio of 1 or more for the asymmetric wetting structure.

According to another embodiment, there may be provided a complex generator formed by stacking two or more of the above-described complex generators or connecting the complex generators in series.

A method of manufacturing a complex generator according to an embodiment of the disclosure may include preparing a MXene coating solution to form a MXene layer, dipping a hydrophilic fiber membrane into the MXene coating solution to coat the hydrophilic fiber membrane with the MXene layer, and drying the MXene layer-coated hydrophilic fiber membrane, wherein electrical energy is generated by an asymmetric wetting structure of a polar solution for the hydrophilic fiber membrane.

According to one aspect, the method may further include asymmetrically dropping the polar solution onto the MXene layer-coated hydrophilic fiber membrane to generate electrical energy.

According to another aspect, the step of generating electrical energy may include asymmetrically dropping the polar solution onto one of two electrodes connected to the MXene layer-coated hydrophilic fiber membrane, so that the electrode of the wetted region and the electrode of the dry region are connected to each other to form a circuit, thereby generating DC voltage, DC current and power.

According to another aspect, the method of manufacturing a complex generator may further include stacking two or more of the MXene layer-coated hydrophilic fiber membranes or connecting the MXene layer-coated hydrophilic fiber membranes in series and parallel.

According to yet another aspect, the MXene coating solution may be prepared by dispersing at least one MXene material among $Ti_2C$, $(Ti_{0.5}, Nb_{0.5})_2C$, $V_2C$, $Nb_2C$, $Mo_2C$, $Mo_2N$, $(Ti_{0.5}, Nb_{0.5})_2C$, $Ti_3C_2$, $Ti_3CN$, $Zr_3C_2$, $Hf_3C_2$, $Ti_4N_3$, $Nb_4C_3$, $Ta_4C_3$, $Mo_2TiC_2$, $Cr_2TiC_2$, and $Mo_2Ti_2C_3$ in water.

According to still another aspect, the MXene layer may be formed by mixing a MXene material and a conductive polymer, and the conductive polymer may include at least one conductive polymer material selected from poly(3,4-ethylenedioxythiophene) (PEDOT:PSS), polyaniline (PANI), polypyrrole (PPy), poly(p-phenylene vinylene) (PPV), Poly(acetylene)s (PAC), and poly(p-phenylene sulfide) (PPS).

According to yet another aspect, the content of the MXene material in the MXene coating solution is in the range of 0.1 to 10 wt % with respect to the polar solvent.

According to another aspect, the hydrophilic fiber membrane may be cut to have a width to height aspect ratio of 1 or more.

According to yet another aspect, the step of applying the MXene layer may include adjusting the cycle of dipping the hydrophilic fiber membrane into the MXene coating solution to control the loading amount of the MXene material.

According to another aspect, in the step of drying, the MXene layer-coated hydrophilic fiber membrane is placed flat on a tray and then subjected to drying in an oven.

Energy generation devices developed to date generate electrical energy in the form of high-frequency AC voltage and current. This is because piezoelectric elements and frictional electrical energy generation devices in which electrical energy is generated by mechanical deformation and friction form a voltage difference instantaneously only when the deformation and friction is applied thereto, and when the applied mechanical action is removed, a voltage difference having an opposite sign is formed again. Such an energy generation device that generates high-frequency AC power has a disadvantage in that a separate rectifier circuit or an energy storage device always need to come along in order to drive electronic devices. In addition, sustained mechanical deformation, friction, or heating damages devices and deteriorates energy generation efficiency of energy generation devices. Furthermore, there is a problem that mechanical deformation, friction, and heat flow cause an energy generation material to be delaminated from a current collector substrate, resulting in poor energy generation efficiency.

In contrast, a MXene layer-coated hydrophilic fiber membrane-based complex generator, which operates based on the principle of an electrical double layer, may generate electrical energy by simply applying a small amount of a polar solution to an energy generation device, and may thus continuously create a voltage differential without damaging the energy generation device. In addition, since the electrical energy is generated in the form of DC, power may be directly supplied to electronic devices without an additional rectifier circuit.

Embodiments of the disclosure may greatly improve energy generation efficiency by applying a large-surface-area MXene layer to a hydrophilic fiber membrane having a large specific surface area, and obtain electrical energy in the form of DC by applying a polar solution to the MXene layer. The electrical energy in the form of DC generated using the complex generator may be directly connected to electronic devices and driven without a separate rectifier circuit. In embodiments of the disclosure, a MXene layer-coated hydrophilic fiber membrane may be mass-produced at low cost through a simple dipping process. It is easy to manufacture a large area, and it is advantageous to easily increase the capacity of a generator through stacking.

FIG. 1 is a schematic view of manufacturing a MXene layer-coated hydrophilic fiber membrane-based complex generator to which a polar solution is applied, which is a manufacturing process of the disclosure. A hydrophilic fiber membrane 101 cut to a certain size is dipped into a MXene coating solution 102 in which MXene particles are dispersed. During the dipping process, the cycle of dipping may be adjusted to control the amount of MXene particles applied to a surface of the hydrophilic fiber membrane. A dipped MXene layer-coated hydrophilic fiber membrane 103 is completed after undergoing a drying process 104 in a drying oven. The resistance of a hydrophilic fiber membrane electrical energy generation device after drying may be in a range of 100 Ω to 100 MΩ, and it is advantageous to have a resistance which is preferably in a range of 10 kΩ to 20 MΩ in order to obtain high voltage and current characteristics. FIG. 1 illustrates a MXene layer formed of MXene particles. The MXene particles may be one or a mixture of two or more selected from $Ti_2C$, $(Ti_{0.5}, Nb_{0.5})_2C$, $V_2C$, $Nb_2C$, $Mo_2C$, $Mo_2N$, $(Ti_{0.5}, Nb_{0.5})_2C$, $Ti_3C_2$, $Ti_3CN$, $Zr_3C_2$, $Hf_3C_2$, $Ti_4N_3$, $Nb_4C_3$, $Ta_4C_3$, $Mo_2TiC_2$, $Cr_2TiC_2$, and $Mo_2Ti_2C_3$. The MXene materials are not limited to specific materials as long as the MXene materials have excellent electrical conductivity and are well bonded to a hydrophilic fiber membrane, and the MXene particles may be used alone or in combination. MXene materials constituting the MXene layer may be mixed with conductive polymers to be used, and the conductive polymers to be used may include at least one conductive polymer material selected from poly(3,4-ethylenedioxythiophene) (PEDOT:PSS), polyaniline (PANI), polypyrrole (PPy), poly(p-phenylene vinylene) (PPV), poly(acetylene)s (PAC), and poly(p-phenylene sulfide) (PPS). In the MXene layer-coated hydrophilic fiber membrane-based complex generator to which a polar solution is applied, a MXene material coated on individual fibers constituting hydrophilic fibers is preferably uniformly coated with MXene particles having a large specific surface area, and the process is most simple in terms of a manufacturing process. A polar solution is dropped into the dipped hydrophilic fiber membrane coated with a dried MXene layer at only one of both ends of the membrane where two electrodes are to be engaged. As the polar solvent, one or two or more polar solvents selected from acetone, acetic acid, water, ethanol, acetonitrile, ammonia, methanol, isopropanol and pyridine may be used in combination with each other. It may also be possible to use a solution in which one or two or more electrolytes among NaCl, KCl, NaBr, KBr, and $CaCl_2$ are dissolved.

When the MXene layer-coated hydrophilic fiber membrane-based complex generator is completely wetted by overly dropping the polar solution, a voltage difference is not created at both electrodes to prevent power generation, and therefore, the amount of the polar solution is appropriate in such an amount that the MXene layer-coated hydrophilic fiber membrane-based complex generator may be wetted by half. The amount of applied polar solution may vary depending on an area of the fiber membrane. In the case of a cotton fiber-based MXene layer-hydrophilic membrane having a size of 0.5 cm×7 cm, 30 μl of polar solution is preferably applied.

Figure 2:
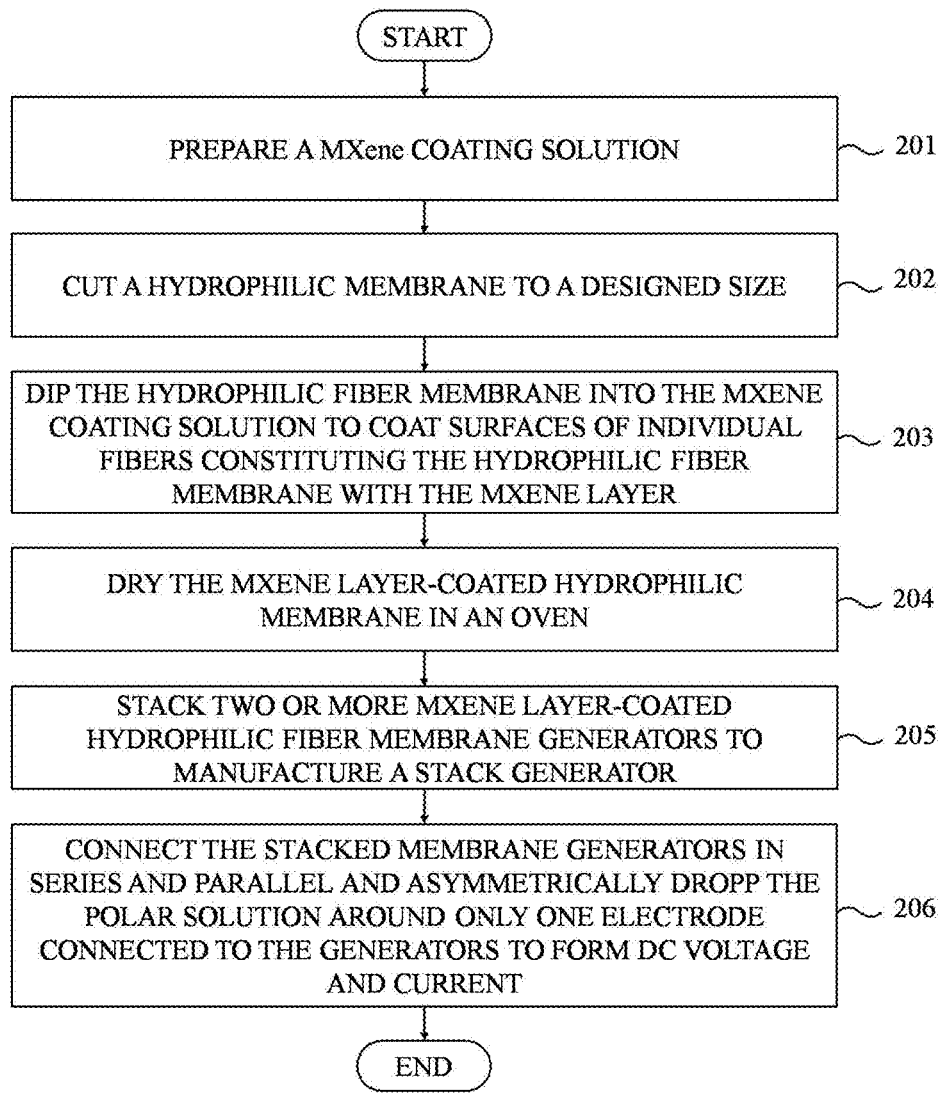
FIG. 2 shows a flowchart of a method of manufacturing a MXene layer-coated hydrophilic fiber membrane-based complex generator operated by a polar solution according to an embodiment of the disclosure.

FIG. 2 shows a flowchart of a method of manufacturing a MXene layer-coated hydrophilic fiber membrane-based complex generator operated by a polar solution according to an embodiment of the disclosure. As seen from FIG. 2, the method includes the steps of preparing a MXene coating solution to form a MXene layer (201), cutting a hydrophilic membrane to a designed size (202), dipping the hydrophilic fiber membrane into the MXene coating solution to coat surfaces of individual fibers constituting the hydrophilic fiber membrane with the MXene layer (203), drying the MXene layer-coated hydrophilic membrane in an oven (204), stacking two or more MXene layer-coated hydrophilic fiber membrane generators to manufacture a stack generator (205), and connecting the stacked membrane generators in series and parallel and asymmetrically dropping a polar solution around only one electrode connected to the generators to form DC voltage and current (206). Here, the asymmetric dropping of the polar solvent may include dropping the polar solvent around only one electrode connected to the generators.

The disclosure is described in detail below through Examples. Examples are merely intended to illustrate the disclosure, and the disclosure is not limited to Examples below.

Manufacture of a $Ti_3C_2$-Coated Cotton Fiber Membrane-Based Complex Generator 0.2 g of $Ti_3C_2$ is mixed with 20 mL of deionized water to prepare a $Ti_3C_2$ coating solution. The cotton fiber membrane was cut in a size of 0.5 cm (height)×7 cm (width) with an aspect ratio of 14. Each cut membrane was dipped once into a solution in which MXene particles were dispersed. The dipped $Ti_3C_2$-coated cotton fiber membrane was placed on a flat tray and subjected to a drying process at 80° C. in a drying oven to finally manufacture a MXene layer-coated hydrophilic fiber membrane-based complex generator in which $Ti_3C_2$ particles were coated on surfaces of individual fibers constituting the cotton fiber membrane. To evaluate power generation properties, open-circuit voltage and short-circuit current properties were evaluated using a potentiostat after dropping 30 μl of deionized water to one electrode of the MXene layer-coated hydrophilic fiber membrane-based complex generators.

Figure 3:
FIG. 3 is an image of a $Ti_3C_2$-coated cotton fiber membrane-based complex generator manufactured according to Example 1 of the disclosure.

FIG. 3 is an image of a $Ti_3C_2$-coated cotton fiber membrane-based complex generator manufactured according to Example 1 of the disclosure. By varying concentration or adjusting the cycle of impregnation, it was possible to control the amount by which MXene is coated on cotton fibers, and a $Ti_3C_2$ uniformly-coated cotton fiber membrane having a size of 0.5 cm (height)×7 cm (width), which is black, was observed.

FIG. 4 is a scanning electron microscope image of a $Ti_3C_2$-coated cotton fiber membrane-based complex generator manufactured according to Example 1 of the disclosure. It is confirmed that $Ti_3C_2$ particles were evenly applied to a 10 μm diameter cotton fiber strand.

Figure 5:
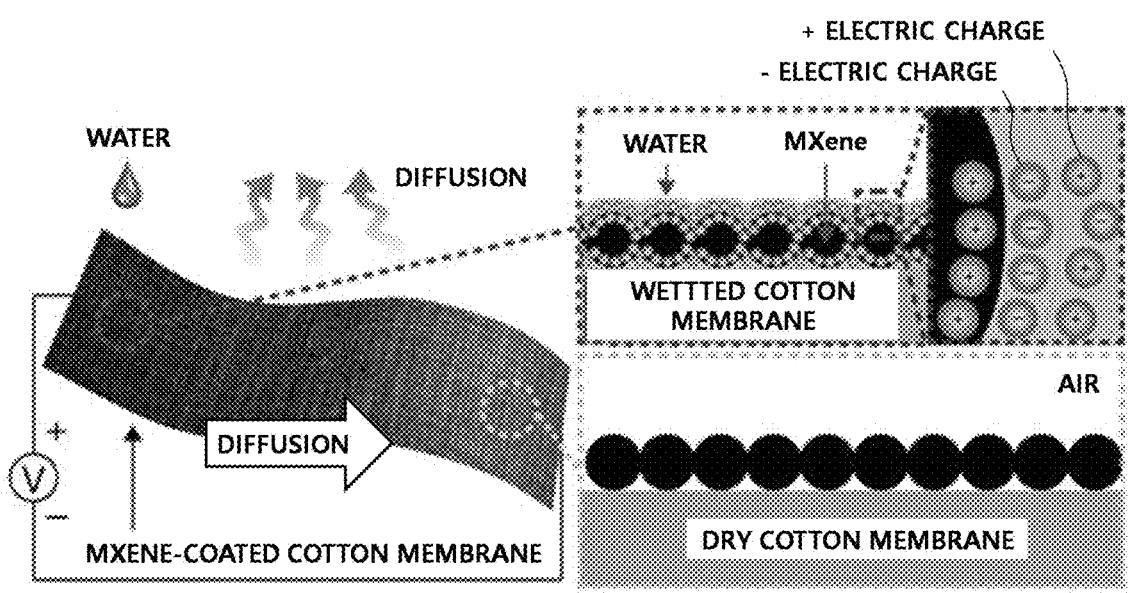
FIG. 5 is a schematic view showing a continuous self-powered energy generation mechanism of a MXene-coated cotton fiber membrane-based complex generator.

FIG. 5 is a schematic view showing an energy generation mechanism of a MXene-coated cotton fiber membrane-based complex generator. On a surface of the MXene particles in a wetted region by water, the surface thereof takes on a negative charge and forms a negative potential due to an electrical double layer. This creates a potential difference between the electrode wetted with water and the electrode connected to a dry region. In this case, when the two electrodes are connected through a circuit, DC voltage, DC current, and power may be generated.

Figure 6:
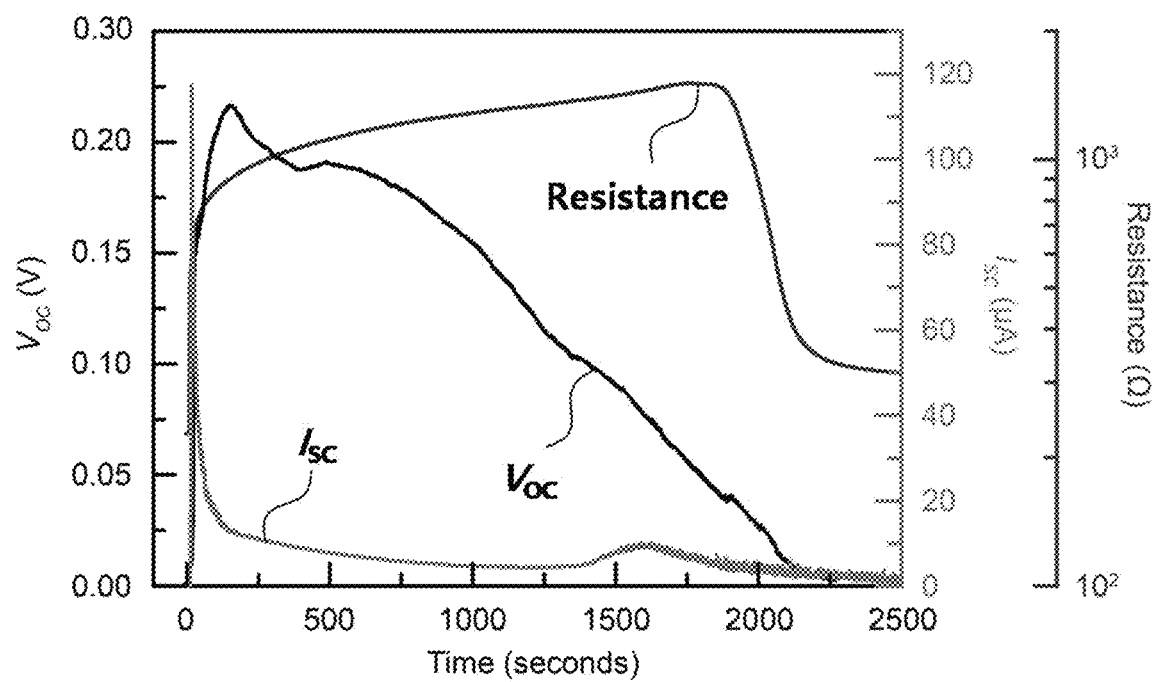
FIG. 6 is a graph of open-circuit voltage, short-circuit current, and resistance measured when water is applied to a $Ti_3C_2$-coated cotton fiber membrane-based complex generator manufactured according to Example 1 of the disclosure.

FIG. 6 is a graph showing changes in open-circuit voltage, short-circuit current, and resistance measured when deionized water is dropped onto a $Ti_3C_2$-coated cotton fiber membrane-based complex generator manufactured according to Example 1 of the disclosure. Since the principles of generating voltage and current are different, it is confirmed that the graph outline of voltage and current is different. Since hydrophilic MXene is used and no surfactant is used, a high capillary diffusion is observed to show a current characteristic of 120 uA. This shows about 120 times improved performance over carbon-based complex generators.

Figure 7:
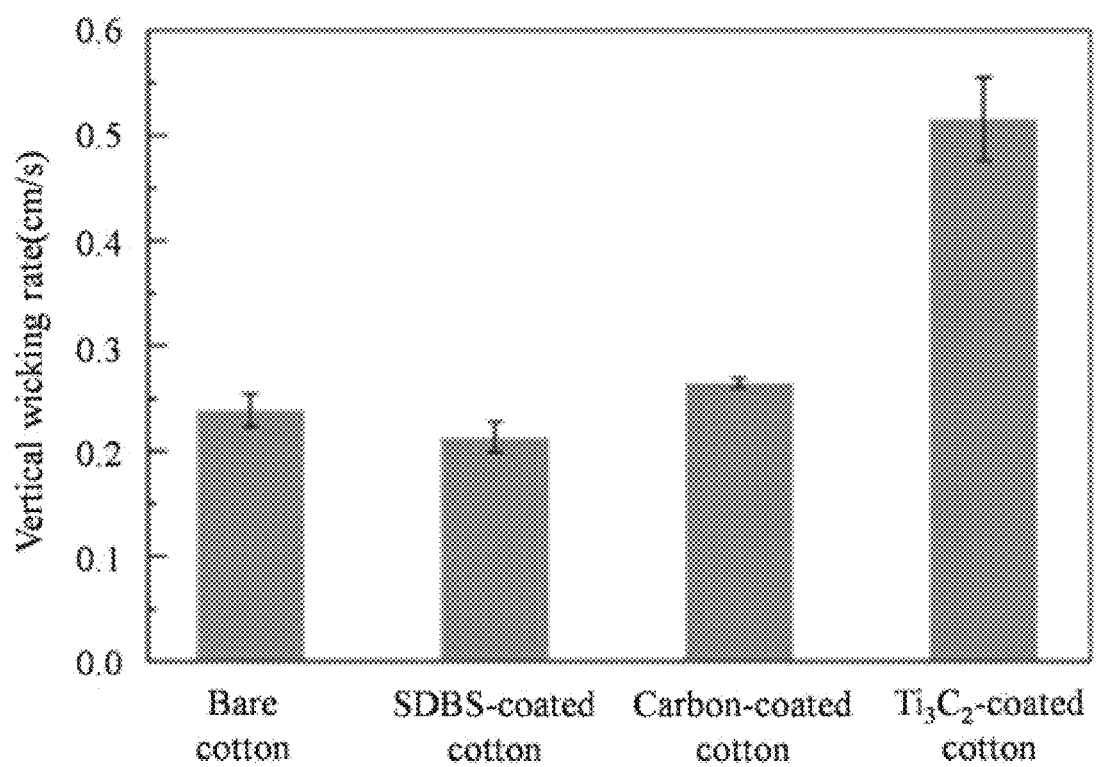
FIG. 7 is a graph showing the absorption capacity of a $Ti_3C_2$-coated cotton fiber membrane-based complex generator manufactured according to Example 1 of the disclosure, a pure hydrophilic membrane, a hydrophilic membrane to which a surfactant is added, and a carbon particle-coated hydrophilic membrane.

FIG. 7 shows that a $Ti_3C_2$-coated cotton fiber membrane complex generator manufactured according to Example 1 of the disclosure provides superior capillary absorption performance to pure cotton fibers, surfactant-containing cotton fibers, and carbon-coated cotton fibers.

Figure 8:
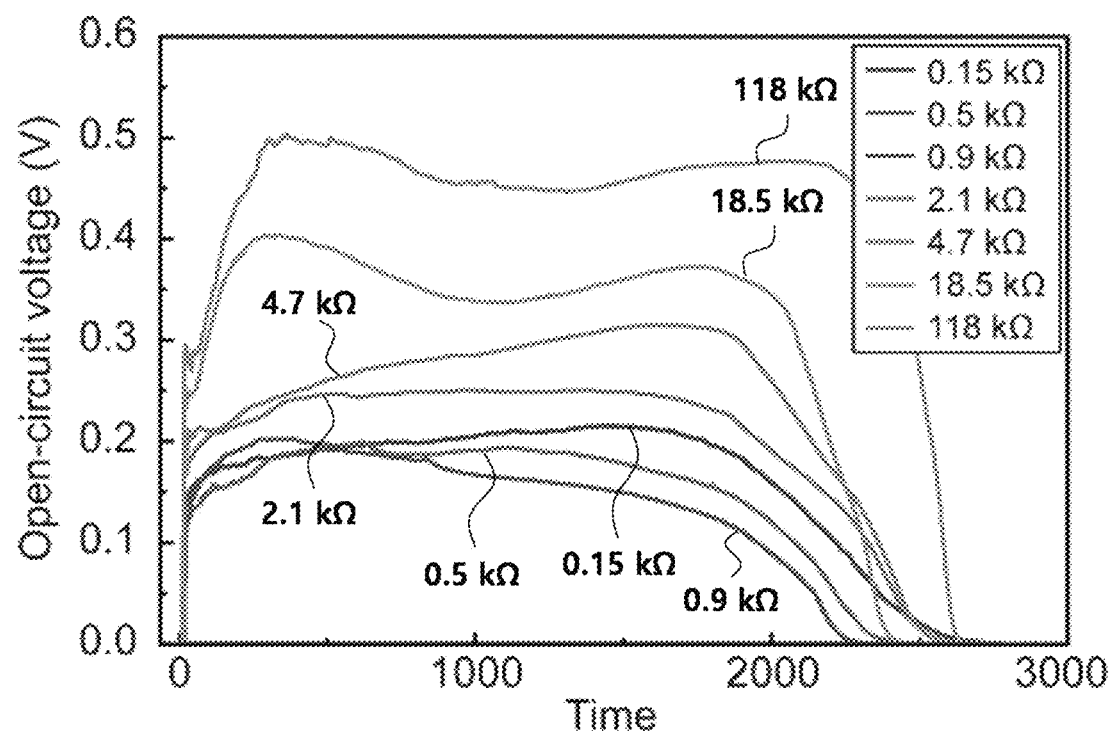
FIG. 8 is a graph of open-circuit voltage measured when water is applied to $Ti_3C_2$-coated cotton fiber membrane-based complex generators having different resistances manufactured according to Example 1 of the disclosure.

FIG. 8 is a graph showing open-circuit voltage according to a change in resistance of a $Ti_3C_2$-coated cotton fiber membrane-based complex generator manufactured according to Example 1 of the disclosure. An electrical double layer energy generation device to which a polar solution is applied varies the efficiency of electrical energy generation according to the resistance of the energy generation device. As described in Example 1, the resistance of the a $Ti_3C_2$-coated cotton fiber membrane-based complex generator was adjusted by varying the cycle of impregnating the cotton fiber membrane with a solution in which $Ti_3C_2$ was dispersed. As the cycle of impregnation increases, the amount of $Ti_3C_2$ particles coated on the surface becomes larger to lower the resistance, and a total of seven samples having resistances of 0.15 kΩ, 0.5 kΩ, 0.9 kΩ, 2.1 kΩ, 4.7 kΩ, 18.5 kΩ, and 118 kΩ are prepared. As seen from the open-circuit voltage graph of FIG. 8, the higher the resistance of the generator, the higher open-circuit voltage (sample 118 kΩ:0.5 V) characteristics were observed, and the lower open-circuit voltage characteristics of the level of 0.22 V were observed in sample 0.15 kΩ with the lowest resistance. It is seen that the adjustment of the base resistance of the $Ti_3C_2$-coated cotton fiber membrane complex generator is important in order to obtain high open-circuit voltage characteristics.

Figure 9:
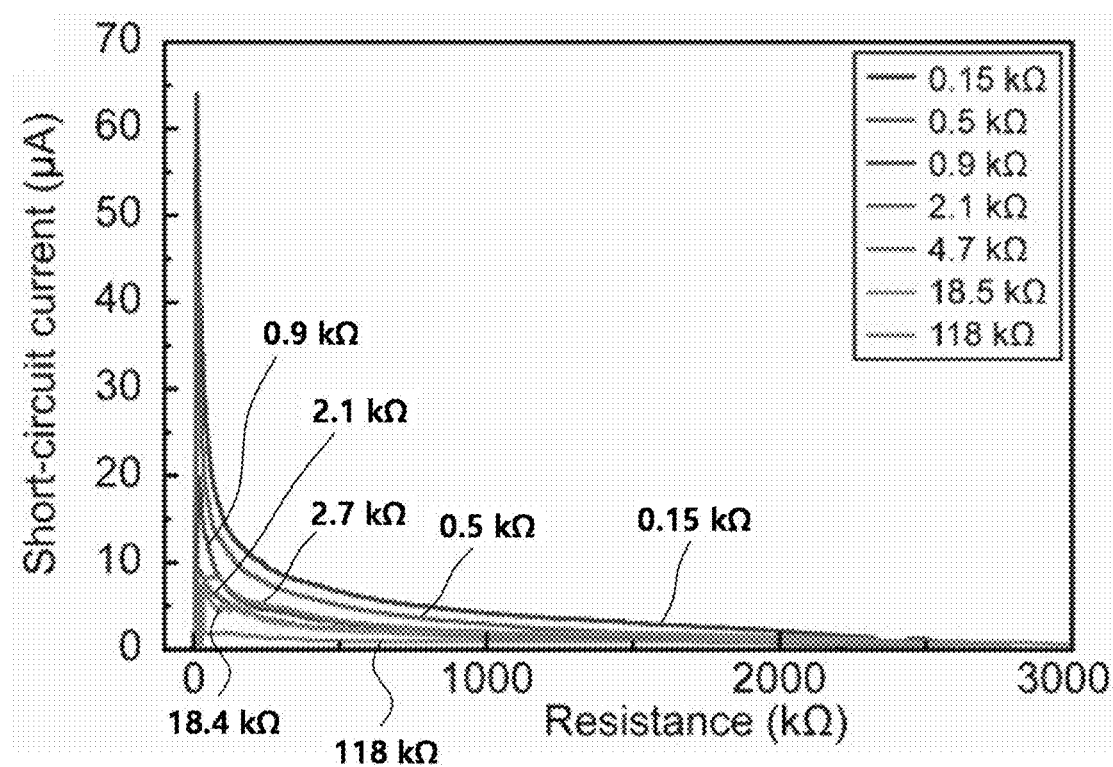
FIG. 9 is a graph of short-circuit current measured when water is applied to $Ti_3C_2$-coated cotton fiber membrane-based complex generators having different resistances manufactured according to Example 1 of the disclosure.

FIG. 9 is a graph showing short-circuit current according to a change in resistance of a $Ti_3C_2$-coated cotton fiber membrane complex generator manufactured according to Example 1 of the disclosure. According to the graph of the short-circuit current characteristic according to the change in resistance of FIG. 7, it is confirmed that the highest short-circuit current (65 μA) characteristic is observed in the generator having a resistance of 0.15 kΩ, and the magnitude of the short-circuit current increases as the resistance decreases.

Figure 10:
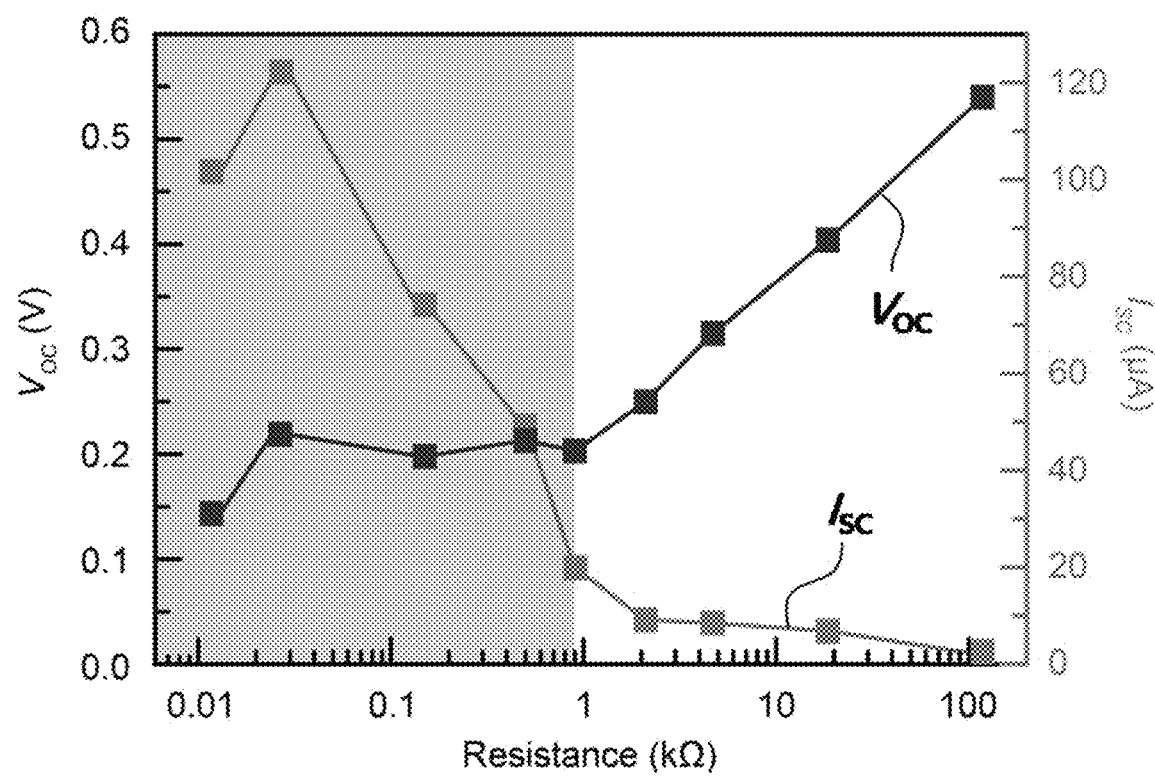
FIG. 10 shows the maximum values of open-circuit voltage and short-circuit current measured when water is applied to $Ti_3C_2$-coated cotton fiber membrane-based complex generators having different resistances manufactured according to Example 1 of the disclosure.
Figure 11:
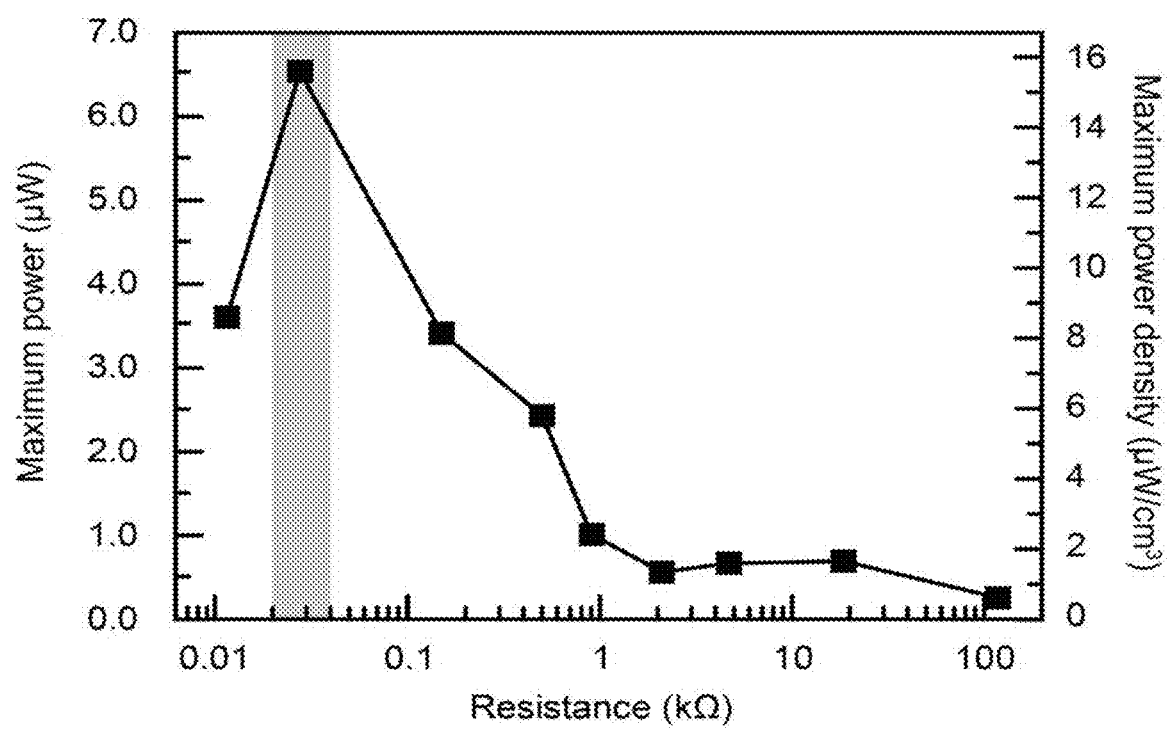
FIG. 11 shows power values measured when water is applied to $Ti_3C_2$-coated cotton fiber membrane-based complex generators having different resistances manufactured according to Example 1 of the disclosure.

FIG. 10 is a graph showing power of a $Ti_3C_2$-coated cotton fiber membrane-based complex generator manufactured according to Example 1 of the disclosure according to a change in resistance. Since the power is determined by the product of current and voltage, it is important to provide high open-circuit voltage and high short-circuit current characteristic values together. In the case of the $Ti_3C_2$-coated cotton fiber membrane-based complex generator, the maximum value is observed at the resistance value where the open-circuit voltage and the short-circuit current values are opposite to each other, and the decrease in the short-circuit current values occurs when the resistance values become equal to or lower than a certain level, so that a power graph is provided as shown in FIG. 11 in order to observe a resistance region capable of obtaining optimum power. A maximum power Pmax showed a value of about 6.6 μW in a generator having 27Ω. It is therefore important to manufacture a $Ti_3C_2$-coated cotton fiber membrane-based complex generator having optimum resistance region in generating voltage, current and power. In the case of $Ti_3C_2$, when the resistance is less than 27Ω, maximum generated power is 6.6 μW due to a decrease in performance.

Figure 12:
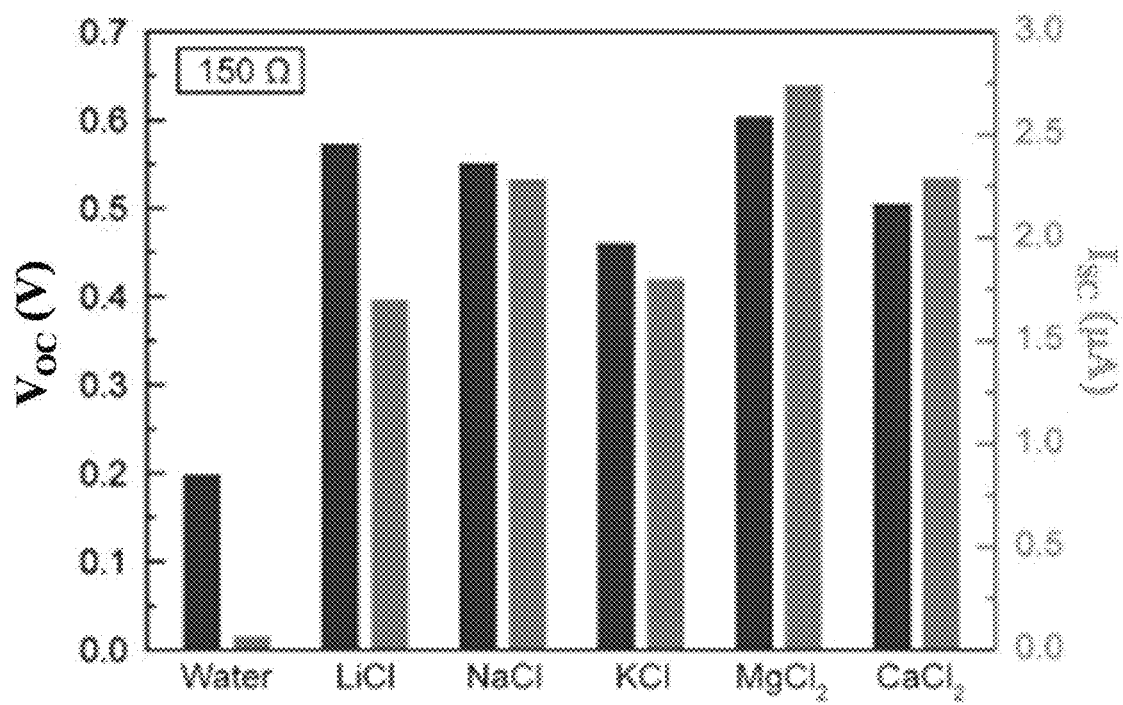
FIG. 12 shows the values of open-circuit voltage and short-circuit current measured when an aqueous solution containing an electrolyte is applied to $Ti_3C_2$-coated cotton fiber membrane-based complex generators having different resistances manufactured according to Example 1 of the disclosure.

FIG. 12 is a graph showing voltage and current generated when an aqueous solution containing various kinds of electrolytes is dropped in a $Ti_3C_2$-coated cotton fiber membrane-based complex generator manufactured according to Example 1 of the disclosure. When 1 M solution of LiCl, NaCl, KCl, $MgCl_2$ and $CaCl_2$ was dropped in addition to water, it is confirmed that the voltage and the current rose by 2 times or more and 50 times or more, respectively, and in particular, it is confirmed that the smaller the cation size of the added electrolyte, the larger the generated voltage size.

Comparative Example 1: Manufacture of a Ketjen Black-Coated Cotton Fiber Membrane-Based Complex Generator, and Comparison of Performance of a Ketjen Black-Coated Cotton Fiber Membrane-Based Complex Generator with the $Ti_3C_2$-Coated Cotton Fiber Membrane-Based Complex Generator 0.2 g of Ketjen black and 0.05 g of surfactant (SDBS, sodium dodecylbenzenesulfonate) were mixed with 20 ml of deionized water to prepare a Ketjen black coating solution. The mixed Ketjen black solution was evenly mixed and dispersed through ultrasonic treatment to prepare a solution in which Ketjen black was dispersed. The cotton fiber membrane was cut into a size of 0.5 cm (height)×7 cm (width) with an aspect ratio of 14. Each cut membrane was dipped once into a solution in which Ketjen black particles were dispersed. The dipped Ketjen black-coated cotton membrane was placed on a flat tray and subjected to a drying process at 80° C. in a drying oven to finally produce a hydrophilic fiber membrane-based complex generator in which Ketjen black particles were coated on surfaces of individual fibers constituting the cotton fiber membrane. To evaluate power generation characteristics, open-circuit voltage, short-circuit current, and voltage characteristics were evaluated using a potentiostat after dropping 0.25 ml of deionized water onto one electrode of the Ketjen black-coated cotton fiber membrane-based complex generator.

Figure 13:
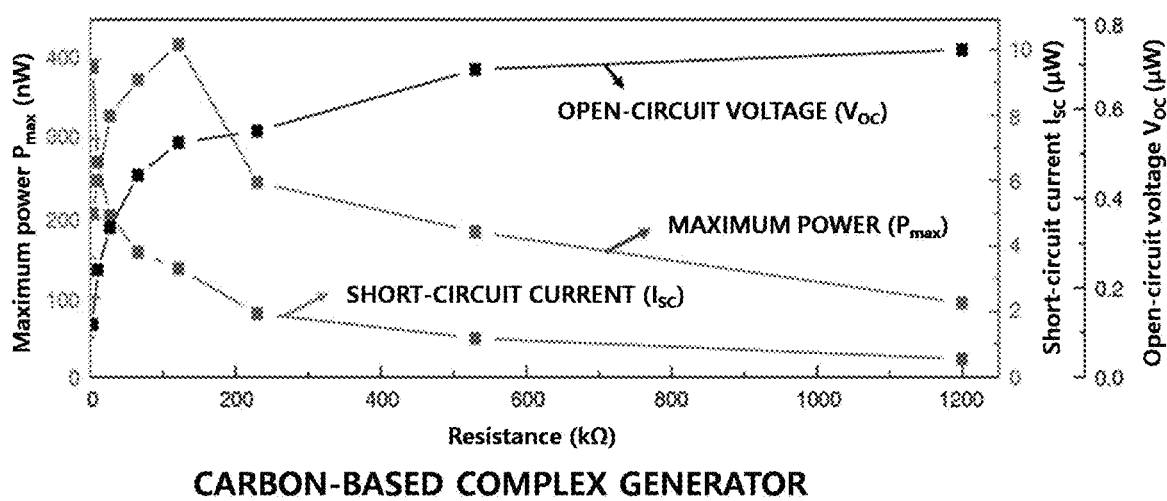
FIG. 13 is a graph of open-circuit voltage, short-circuit current, and voltage measured when water is applied to ketjen black-coated cotton fiber membrane-based complex generators having different resistances manufactured according to Comparative Example 1 of the disclosure.

FIG. 13 is a graph showing voltage, current, and power generated when water is dropped onto a ketjen black-coated cotton fiber membrane-based complex generator manufactured according to Comparative Example 1 of the disclosure according to resistance. Examples and Comparative Example experiments indicate that in the case of a complex generator having a MXene layer, the magnitude of the voltage is slightly reduced, while the magnitude of the current greatly rises due to high conductivity, and thus, the complex generator having a MXene layer exhibit higher power generation than a complex generator having a Ketjen black layer.

Example 2: Manufacture of a $Ti_3C_2$/PANi Mixture-Coated Cotton Fiber Membrane-Based Complex Generator 0.2 g of $Ti_3C_2$ and 0.2 g PANi were mixed with 20 ml of deionized water to prepare a $Ti_3C_2$/PANi mixed coating solution. The cotton fiber membrane was cut into a size of 0.5 cm (height)×7 cm (width) with an aspect ratio of 14. Each cut membrane was dipped once into the $Ti_3C_2$/PANi mixed coating solution. The dipped $Ti_3C_2$-coated cotton membrane was placed on a flat tray and subjected to a drying process at 80° C. in a drying oven to finally manufacture a $Ti_3C_2$/PANi-coated hydrophilic fiber membrane-based complex generator in which $Ti_3C_2$/PANi mixtures were coated on surfaces of individual fibers constituting the cotton fiber membrane. To evaluate power generation characteristics, open-circuit voltage and short circuit current characteristics were evaluated using a potentiostat after dropping 30 μl of deionized water to one electrode of the $Ti_3C_2$/PANi-coated hydrophilic fiber membrane-based complex generator.

Figure 14:
FIG. 14 is a scanning electron microscope image of a $Ti_3C_2$/PANi-coated cotton fiber membrane-based complex generator manufactured according to Example 2 of the disclosure.

FIG. 14 shows an image of a $Ti_3C_2$/PANi-coated hydrophilic fiber membrane-based complex generator manufactured according to Example 2 of the disclosure. In FIG. 3, it is seen that, due to the addition of PANi in the form of black powder, the $Ti_3C_2$/PANi-coated hydrophilic fiber membrane-based complex generator has a much darker color than the sample containing $Ti_3C_2$ alone.

Figure 15:
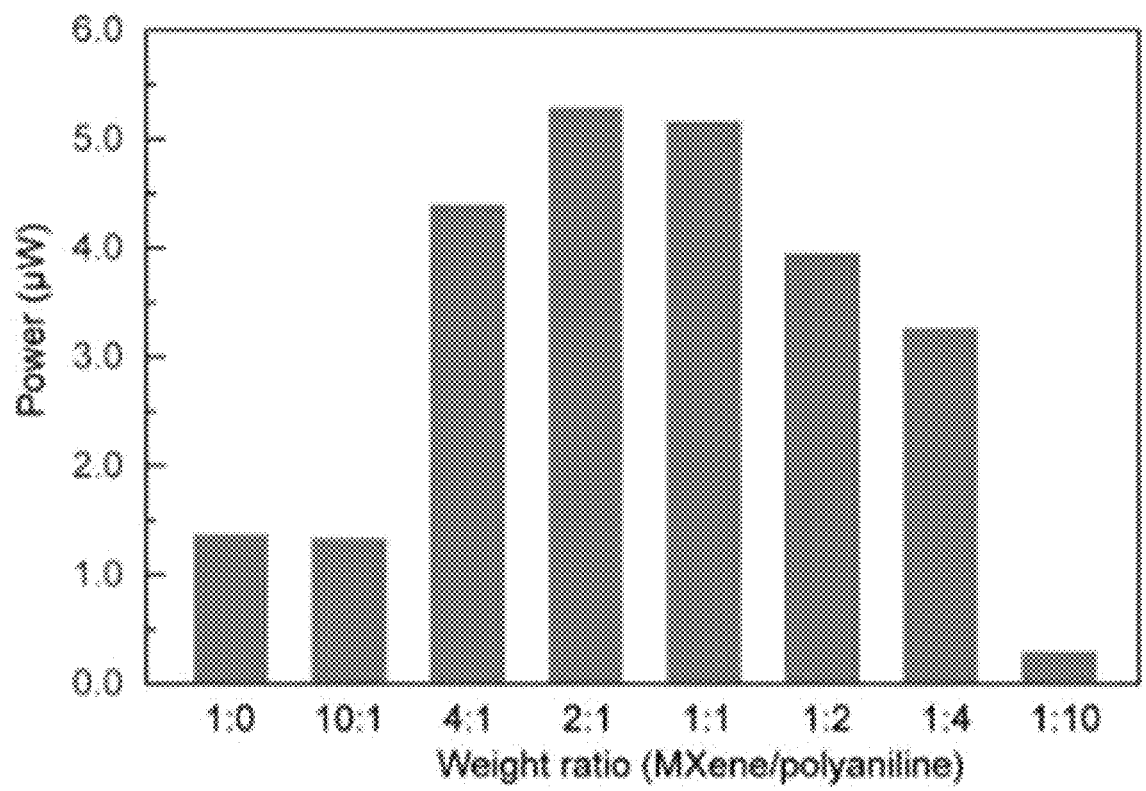
FIG. 15 is a graph of power measured by adjusting a weight ratio of $Ti_3C_2$ to PANi of a $Ti_3C_2$/PANi-coated cotton fiber membrane-based complex generator manufactured according to Example 2 of the disclosure.

FIG. 15 is a graph showing the magnitude of power measured by changing the ratio of $Ti_3C_2$ to PANi for $Ti_3C_2$/PANi manufactured according to Example 2 of the disclosure. As shown in FIG. 15, it is seen that when PANi is added in a greater amount than pure $Ti_3C_2$, the performance gets improved, and the highest efficiency is shown when the weight ratio is 2:1. It is also seen that PANi used in this case does not have higher conductivity than $Ti_3C_2$, and accordingly, the addition of excess PANi rather shows a deterioration in performance. Thus, it is confirmed that, under the same conditions, the $Ti_3C_2$/PANi-coated hydrophilic fiber membrane-based complex generator exhibits superior electricity generation efficiency to the $Ti_3C_2$-coated cotton fiber membrane-based complex generator.

Figure 16:
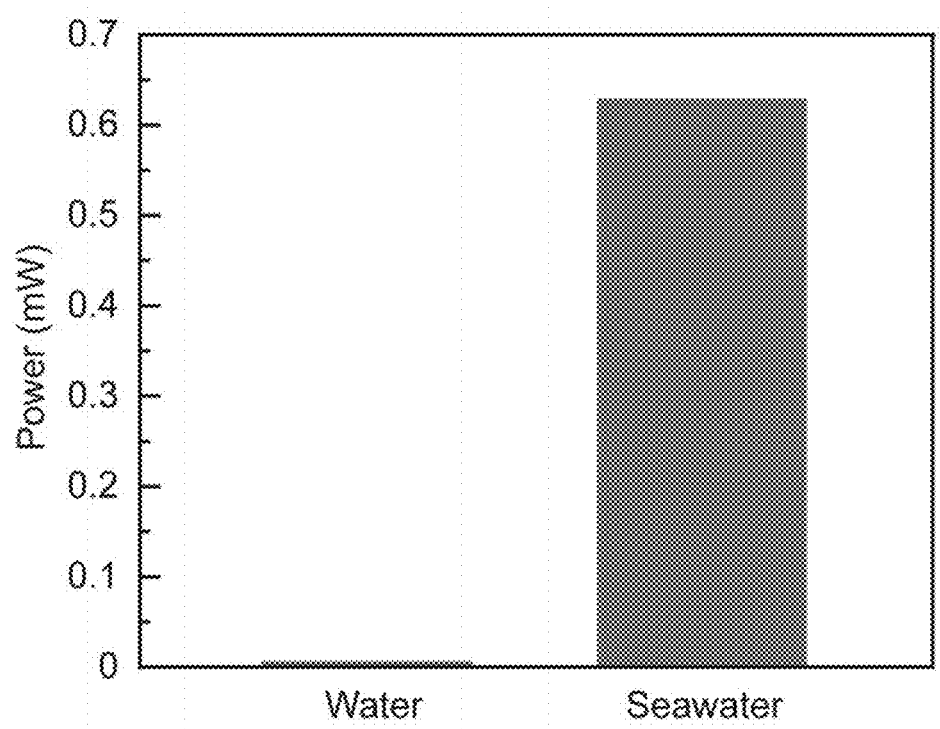
FIG. 16 is a graph comparing power generated when water and seawater drop in a $Ti_3C_2$/PANi-coated cotton fiber membrane-based complex generator manufactured according to Example 3 of the disclosure.

Example 3: Improved Energy Performance of a $Ti_3C_2$/PANi Mixture-Coated Cotton Fiber Membrane-Based Complex Generator Using Seawater FIG. 16 is a graph comparing power generated when water and seawater are applied to a $Ti_3C_2$/PANi-coated hydrophilic fiber membrane-based complex generator manufacture according to Example 2 of the disclosure. In seawater, a large amount of NaCl is dissolved, which helps to form an electrical double layer, resulting in an enhanced voltage effect. In addition, Na ions may move together during the diffusion of water, and the moved ions may be converted into additional power. This overlapping effect of voltage and current has shown a power enhancement effect of about 50 times, and has shown the highest efficiency out of existing power generation attempts using water.

Figure 17:
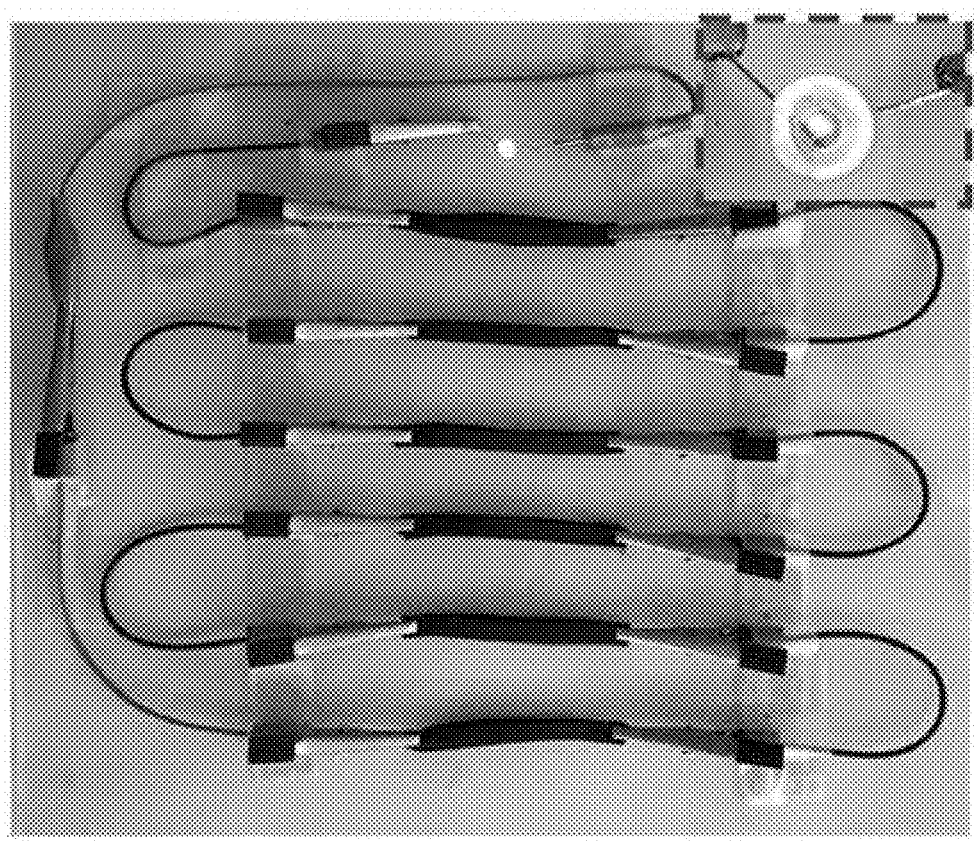
FIG. 17 is an image of a blue LED driven using high power generated when seawater is dropped in a $Ti_3C_2$/PANi-coated cotton fiber membrane-based complex generator manufactured according to Example 4 of the disclosure.

Example 4: Driving LED, and Charging a Super Capacitor and a Battery Using a $Ti_3C_2$/PANi Mixture-Coated Cotton Fiber Membrane-Based Complex Generator Using Seawater Connecting $Ti_3C_2$/PANi-coated hydrophilic fiber membrane-based complex generators manufactured according to Example 2 in series and parallel allows the magnitude of generated voltage and current to be greatly amplified. In the case of an existing carbon (ketjen black)-coated complex generator, generated power is small only to turn on Red LED, but it is seen from FIG. 17 that, six MXene-coated complex generators may be connected in series to drive a blue LED. Each of the six MXene-coated complex generators may be configured with three MXene-coated generators connected in parallel.

Figure 18:
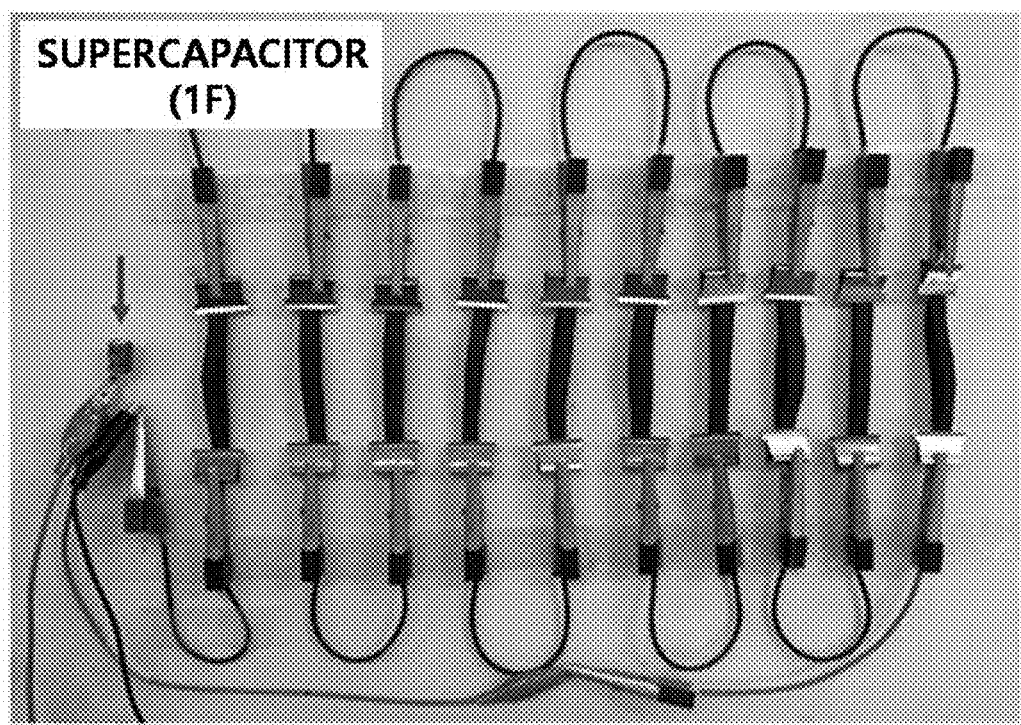
FIG. 18 is an image of a 1 F super capacitor charged using high power generated when seawater is dropped in a $Ti_3C_2$/PANi-coated cotton fiber membrane-based complex generator manufactured according to Example 4 of the disclosure.
Figure 19:
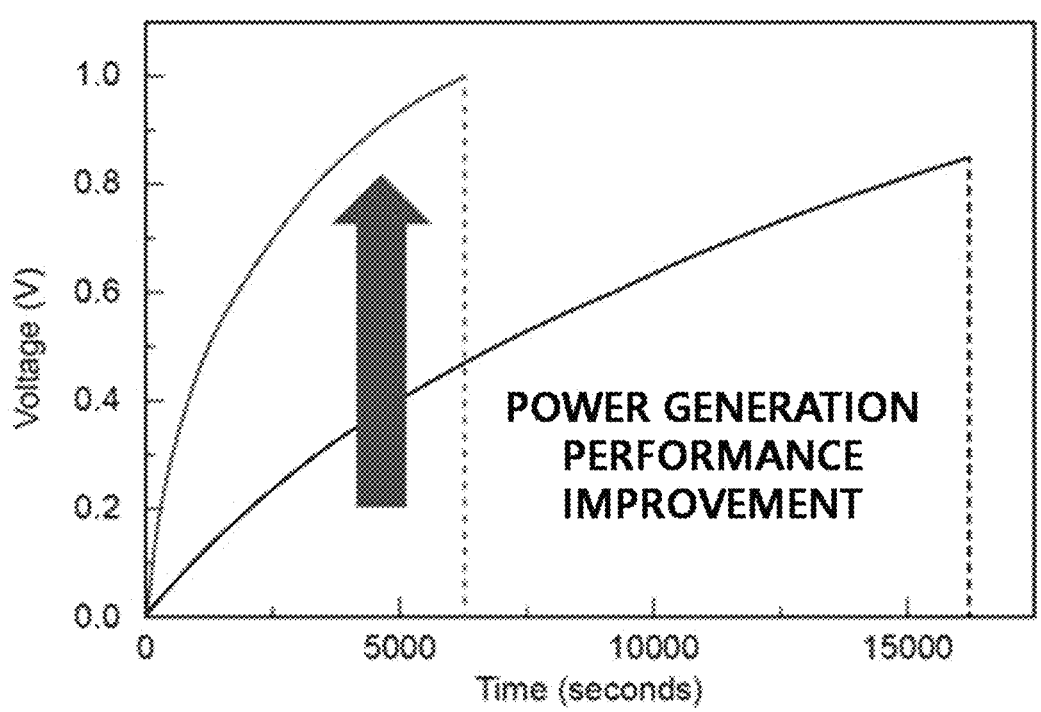
FIG. 19 is a graph of voltage for charging a 1 F super capacitor using high power generated when seawater is dropped in a $Ti_3C_2$/PANi-coated cotton fiber membrane-based complex generator manufactured according to Example 4 of the disclosure.

As a result of charging the super capacitor of 1 F with the carbon complex generator and the MXene complex generator (FIG. 18) having the same volume, it is seen from FIG. 19 that the time required for charging up to 1 V is reduced by about three times or more.

Figure 20:
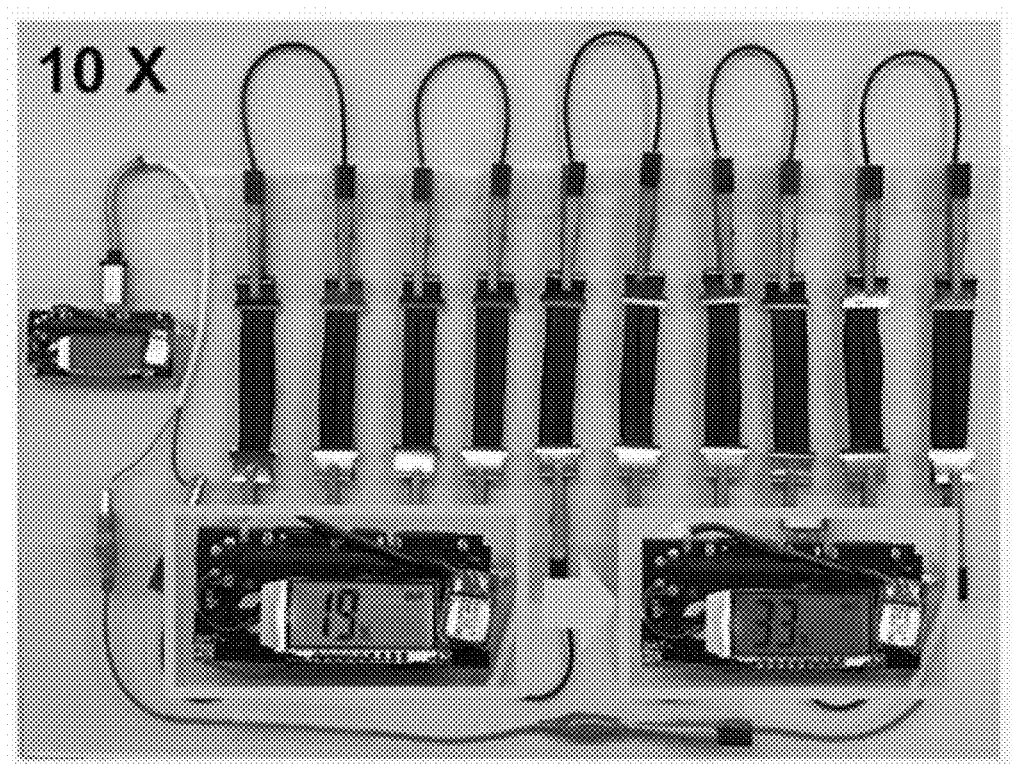
FIG. 20 is an image of charging a commercialized battery using high power generated when seawater is dropped in a $Ti_3C_2$/PANi-coated cotton fiber membrane-based complex generator manufactured according to Example 4 of the disclosure.

A minimum of 5 V, 1 A of power is required to charge a battery. In order to satisfy the condition, about 10000 or more carbon-based complex generators are required, but the use of a high-performance MXene-based complex generator, as seen in FIG. 20, enabled 160 complex generators to charge a small battery (30 mAhr) up to 19% to 33% for 25 minutes, thereby making it possible to find the superiority of the MXene-based complex generator.

Although the embodiments have been described above with reference to the limited embodiments and drawings, various modifications and variations are possible to those skilled in the art from the above description. For example, appropriate results may be achieved even when the described techniques are performed in a different order than the described methods, and/or when components of the described systems, structures, devices, circuits, etc. are bonded or combined in different forms from the described method, or replaced or substituted by other components or equivalents.

Therefore, other implementations, other embodiments, and equivalents to the claims are within the scope of the following claims.

What is claimed is:
1. A complex generator comprising:
a MXene layer-coated hydrophilic fiber membrane, wherein the MXene layer is formed by mixing MXene materials and conductive polymers, and the conductive polymers comprise at least one conductive polymer material selected from poly (3,4-ethylenedioxythiophene) (PEDOT:PSS), polyaniline (PANI), polypyrrole (PPy), Poly (p-phenylene vinylene) (PVV), poly (acetylene) s (PAC), and poly (p-phenylene sulfide) (PPS),
wherein electrical energy is generated by an asymmetric wetting structure of a polar solution for the hydrophilic fiber membrane,
wherein, in the MXene layer-coated hydrophilic fiber membrane, the electrical energy is generated by using a voltage difference between a MXene layer region wetted by the polar solution and a MXene layer region non-wetted by the polar solution, and opposite poles to generate the electrical energy is formed by the MXene layer region wetted by the polar solution and the MXene layer region non-wetted by the polar solution;
wherein the polar solution comprises an electrolyte selected from NaBr, KBr, or a combination thereof, dissolved therein at a concentration of 0.01 wt % to 0.1 wt %.

2. The complex generator of claim 1, wherein, in the MXene layer-coated hydrophilic fiber membrane, a current is generated in the course of diffusion of the polar solution from the MXene layer region wetted by the polar solution to the MXene layer region non-wetted by the polar solution, and the current is used to generate electrical energy.

3. The complex generator of claim 1, wherein the asymmetric wetting structure comprises a structure which wets an area covering a range of 0.1% to 99% with respect to a total volume of the MXene layer-coated hydrophilic fiber membrane.

4. The complex generator of claim 1, wherein the polar solution comprises one or a mixture of two or more among acetone, acetic acid, water, ethanol, acetonitrile, ammonia, methanol, isopropanol, and pyridine.

5. The complex generator of claim 1, wherein MXene materials constituting the Maxine layer comprise at least one among $Ti_2C$, $(Ti_{0.5}, Nb_{0.5})_2C$, $V_2C$, $Nb_2C$, $Mo_2C$, $Mo_2N$, $(Ti_{0.5}, Nb_{0.5})_2C$, $Ti_3C_2$, $Ti_3CN$, $Zr_3C_2$, $Hf_3C_2$, $Ti_4N_3$, $Nb_4C_3$, $Ta_4C_3$, $Mo_2TiC_2$, $Cr_2TiC_2$, and $Mo_2Ti_2C_3$.

6. The complex generator of claim 1, wherein the MXene layer is coated on the hydrophilic fiber membrane by loading the hydrophilic fiber membrane with MXene materials in a range of 0.9 $mg/cm^3$ to 0.007 $mg/cm^3$ per unit volume, and
the amount of MXene materials to be loaded is controlled to vary the resistance of the MXene layer-coated hydrophilic fiber membrane, thereby enabling control of voltage and current to be generated.

7. The complex generator of claim 1, wherein the hydrophilic fiber membrane has the ability to absorb and contain water, and comprises at least one among cotton fabric, mulberry paper, polypropylene membrane, oxygen plasma treated nonwoven fabric, hydrophilic surface treated fabric, and nanofibers.

8. The complex generator of claim 1, wherein the hydrophilic fiber membrane is made of fiber strands for increasing a specific surface area, and surfaces of the individual fibers are coated with the MXene layer bonded thereto.

9. The complex generator of claim 1, wherein the fiber strands constituting the hydrophilic fiber membrane has a diameter of 50 nm to 500 μm.

10. The complex generator of claim 1, wherein the hydrophilic fiber membrane has a thickness of 10 μm to 1 mm.

11. The complex generator of claim 1, wherein the hydrophilic fiber membrane has a width to height aspect ratio of 1 or more for the asymmetric wetting structure.

12. A complex generator in which two or more complex generators according to claim 1 are stacked or connected in series.

13. A method of manufacturing a complex generator, the method comprising:
preparing a MXene coating solution to form a MXene layer;
dipping a hydrophilic fiber membrane into the MXene coating solution to coat the hydrophilic fiber membrane with the MXene layer, wherein the MXene coating solution comprises MXene materials and conductive polymers, and the conductive polymers comprise at least one conductive polymer material selected from poly (3,4-ethylenedioxythiophene) (PEDOT:PSS), polyaniline (PANI), polypyrrole (PPy), Poly (p-phenylene vinylene) (PVV), poly (acetylene)s (PAC), and poly (p-phenylene sulfide) (PPS); and
drying the MXene layer-coated hydrophilic fiber membrane,
wherein electrical energy is generated by an asymmetric wetting structure of a polar solution for the hydrophilic fiber membrane,
wherein, in the MXene layer-coated hydrophilic fiber membrane, the electrical energy is generated by using a voltage difference between a MXene layer region wetted by the polar solution and a MXene layer region non-wetted by the polar solution, and opposite poles to generate the electrical energy is formed by the MXene layer region wetted by the polar solution and the MXene layer region non-wetted by the polar solution; and
wherein the method further comprises asymmetrically dropping the polar solution onto the MXene layer-coated hydrophilic fiber membrane to generate electrical energy, and
the polar solution comprises an electrolyte selected from NaBr, KBr, or a combination thereof, dissolved therein at a concentration of 0.01 wt % to 0.1 wt %.

14. The method of claim 13, wherein the generating of electrical energy comprises:
asymmetrically dropping the polar solution onto one of two electrodes connected to the MXene layer-coated hydrophilic fiber membrane, so that the electrode of a wetted region and the electrode of a dry region are connected to each other to form a circuit, thereby generating DC voltage, DC current, and power.

15. The method of claim 13, further comprising stacking two or more of the MXene layer-coated hydrophilic fiber membranes or connecting those MXene layer-coated hydrophilic fiber membranes together in series and parallel.

16. The complex generator of claim 1, wherein MXene materials constituting the MXene layer comprise at least one among $Mo_2N$, $Ti_3CN$, and $Cr_2TiC_2$.

* * * * *